United States Patent
Xin et al.

(10) Patent No.: US 10,380,959 B2
(45) Date of Patent: Aug. 13, 2019

(54) PIXEL UNIT DRIVING CIRCUIT, DRIVING METHOD AND DISPLAY APPARATUS FOR PIXEL UNIT USING ALTERNATELY SWITCHING ELEMENTS HAVING INVERTED POLARITIES

(71) Applicants: BOE Technology Group Co., Ltd., Beijing (CN); Chengdu BOE Optoelectronics Technology Co., Ltd., Chengdu (CN)

(72) Inventors: Yanxia Xin, Beijing (CN); Seoungyik Park, Beijing (CN); Haoyuan Fan, Beijing (CN); Zailong Mo, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 15/325,025

(22) PCT Filed: Jan. 25, 2016

(86) PCT No.: PCT/CN2016/071988
§ 371 (c)(1),
(2) Date: Jan. 9, 2017

(87) PCT Pub. No.: WO2017/031944
PCT Pub. Date: Mar. 2, 2017

(65) Prior Publication Data
US 2017/0229078 A1    Aug. 10, 2017

(30) Foreign Application Priority Data
Aug. 26, 2015    (CN) .......................... 2015 1 0530593

(51) Int. Cl.
*G09G 3/36* (2006.01)
*G02F 1/13* (2006.01)

(52) U.S. Cl.
CPC .............. *G09G 3/3614* (2013.01); *G02F 1/13* (2013.01); *G09G 3/36* (2013.01); *G09G 3/3648* (2013.01);
(Continued)

(58) Field of Classification Search
CPC ......... G09G 3/3614; G09G 2300/0823; G09G 2310/0254; G09G 2310/0256
See application file for complete search history.

(56) References Cited

U.S. PATENT DOCUMENTS 5,193,018 A * 3/1993 Wu ........................... G02F 1/13
349/106
5,351,145 A    9/1994 Miyata et al.
(Continued)

FOREIGN PATENT DOCUMENTS

CN    101354506 A    1/2009
CN    102117602 A    7/2011
(Continued)

OTHER PUBLICATIONS

First Office Action, including Search Report, for Chinese Patent Application No. 201510530593.7, dated Mar. 2, 2017, 16 pages.
(Continued)

*Primary Examiner* — Ram A Mistry
(74) *Attorney, Agent, or Firm* — Westman, Champlin & Koehler, P.A.

(57) ABSTRACT

The present disclosure provides a pixel unit driving circuit, a driving method and a display apparatus. According to the present disclosure, pixel units in a panel are designed to use switch elements of the pixel units made of NMOS transistors and PMOS transistors alternately. That is, the switch ele-
(Continued)

ments connected to scan signal lines and data lines use NMOS transistors and PMOS transistors alternately in the horizontal (vertical) direction. In conjunction with a scan timing sequence, a high-low level time division scan technique can be adopted to allow the voltage difference between the data lines and the pixel electrodes to vary alternately between positive and negative.

19 Claims, 6 Drawing Sheets

(52) U.S. Cl.
CPC ......... *G09G 3/3677* (2013.01); *G09G 3/3688* (2013.01); *G09G 2300/0426* (2013.01); *G09G 2300/0809* (2013.01); *G09G 2320/0209* (2013.01)

(56) References Cited

U.S. PATENT DOCUMENTS

| | | | |
|---|---|---|---|
| 5,432,527 A | | 7/1995 | Yanai et al. |
| 5,831,707 A | * | 11/1998 | Ota .................. G02F 1/134363 349/141 |
| 6,011,531 A | | 1/2000 | Mei et al. |
| 8,941,696 B2 | | 1/2015 | Choi |
| 2007/0097056 A1 | | 5/2007 | Tseng |
| 2007/0229431 A1 | | 10/2007 | Kang et al. |
| 2011/0025936 A1 | | 2/2011 | Chang et al. |
| 2012/0120035 A1 | | 5/2012 | Yang et al. |
| 2013/0328758 A1 | | 12/2013 | Stronks et al. |
| 2014/0043215 A1 | | 2/2014 | Hu |
| 2014/0078032 A1 | * | 3/2014 | Xia .................. G09G 3/3648 345/92 |

FOREIGN PATENT DOCUMENTS

| | | |
|---|---|---|
| CN | 102810304 A | 12/2012 |
| CN | 102832212 A | 12/2012 |
| CN | 102955309 A | 3/2013 |
| CN | 103680434 A | 3/2014 |
| CN | 105047161 A | 11/2015 |
| EP | 0495428 A2 | 7/1992 |
| JP | 2005-165038 A | 6/2005 |
| KR | 100744136 B1 | 7/2007 |

OTHER PUBLICATIONS

English translation of International Search Report and Written Opinion for International Application No. PCT/CN2016/071988, dated Jun. 1, 2016, 6 pages total.
International Search Report and Written Opinion of International Application No. PCT/CN2016/071988, dated Jun. 1, 2016, 9 pages.
English translation of Box No. V of the Written Opinion for the International Searching Authority for International Application No. PCT/CN2016/071988, 2 pages.
European Search Report from European Patent Application No. 16819414.0 dated Nov. 29, 2017, 9 pages.
Communication pursuant to Article 94(3) EPC for European Patent Application No. 16 819 414.0, dated Jan. 11, 2019, 10 pages.

* cited by examiner

PIXEL UNIT DRIVING CIRCUIT, DRIVING METHOD AND DISPLAY APPARATUS FOR PIXEL UNIT USING ALTERNATELY SWITCHING ELEMENTS HAVING INVERTED POLARITIES

CROSS REFERENCE

This application is a U.S. National Phase Application of International Application No. PCT/CN2016/071988, filed on Jan. 25, 2016, entitled "PIXEL UNIT DRIVING CIRCUIT, DRIVING METHOD AND DISPLAY APPARATUS," which claims priority to Chinese Application No. 201510530593.7, filed on Aug. 26, 2015, both of which are incorporated herein by reference in their entirety.

TECHNICAL FIELD

The present disclosure relates to display technology, and more particularly, to a pixel driving circuit for a liquid crystal panel and its associated driving method, as well as a display apparatus.

BACKGROUND

Thin Film Transistor-Liquid Crystal Display (TFT-LCD) is currently a popular type of planar display. Low Temperature Poly-Silicon (LTPS) technique is a new generation of TFT display, which provides a higher resolution and a better picture display quality. The basic structure of a TFT-LCD includes a liquid crystal panel composed of two substrates. A liquid crystal capacitance can be created by applying electrical field to the substrates, so as to control orientation of the liquid crystal. In order to prevent image degradation due to use of unidirectional electrical field for a long time, the polarity of a data voltage relative to a common voltage needs to be frequently inverted. For a small-size LCD, in order to reduce its power consumption, a column inversion mode is typically adopted. However, when compared with a point inversion mode, the column inversion mode is significantly inferior in terms of vertical cross-interference.

Figure 1:
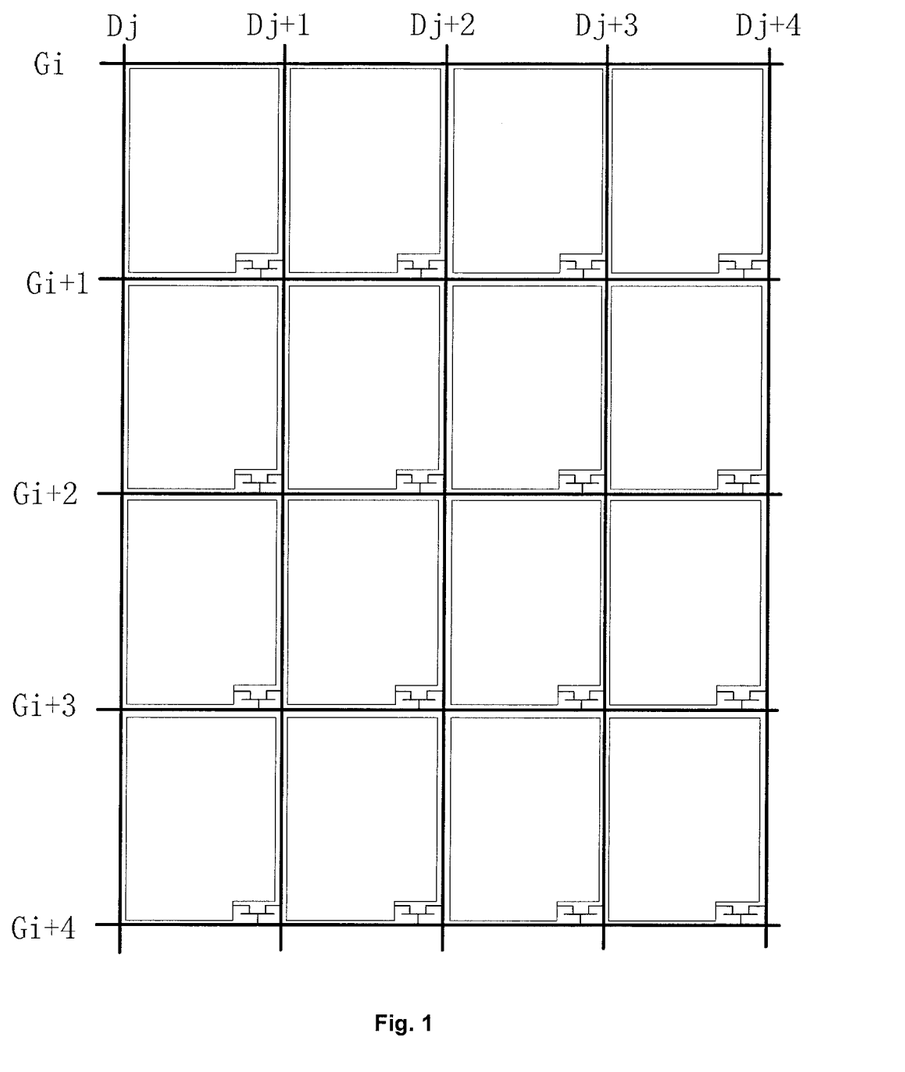
FIG. 1 is a schematic diagram showing a structure of a conventional pixel unit driving circuit.

FIG. 1 is a schematic diagram showing a structure of a conventional pixel unit driving circuit. As shown in FIG. 1, the panel components include a plurality of scan signal lines G1-Gn (among which only the scan signal lines Gi-Gi+4 are shown in FIG. 1 for illustration), a plurality of data lines D1-Dm (among which only the data lines Dj-Dj+4 are shown in FIG. 1 for illustration), and pixel units connected to the scan signal lines and the data lines. The scan signal lines and the data lines are cross-connected to the switch elements of the pixel units and are arranged in a matrix form, so as to constitute a pixel unit driving circuit. Typically, the switch elements for the pixel units formed by an LTPS array are NMOS transistors, for which the driving method is shown in FIG. 1. An output voltage of a gate (scan signal line) can only have two possible values: an on voltage (high level) t1 and an off voltage (low level) t2. For each frame, T, of picture, the switch elements are on and the pixels in row G1 are charged when the high level t1 is outputted at G1, and the switch element are off and the pixels in row G1 are maintained when the low level t2 is outputted at G1. The high level is outputted at G2 when the low level is outputted at G1. Similar operation modes apply to rows G2-Gm. However, when the pixels in row G1 are being charged, the data signals on the data lines D1-Dn will be applied to all the pixels in rows G1-Gm. While the switch elements are off, the capacitive coupling effect between the data lines and the pixel electrodes will affect the maintained state of the pixels in rows G2-Gm, thereby causing a vertical cross-interference in the displayed picture. This problem becomes even worse at a higher resolution.

Figure 2:
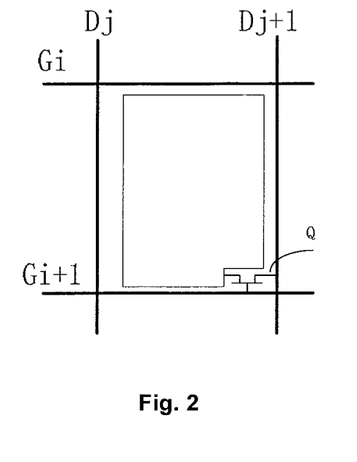
FIG. 2 is a schematic diagram showing a basic structure of a pixel unit.

FIG. 2 is a schematic diagram showing a basic structure of a pixel unit. As shown in FIG. 2, each pixel unit includes a switch element, Q, connected to the one of the scan signal lines G1-Gn and one of the data lines D1-Dm. The switch elements can be typically NMOS transistors, or alternatively PMOS transistors.

In the conventional pixel unit shown in FIG. 1 and FIG. 2, the polarity of the data voltage relative to the common voltage needs to be frequently inverted. Such column inversion mode has a poor performance in terms of vertical cross-interference.

SUMMARY

In order to at least in part overcome the vertical cross-interference due to such column inversion mode, the present disclosure provides a pixel unit driving circuit and driving method.

In an aspect of the present disclosure, a pixel unit driving circuit for driving a light emitting element of a pixel unit is provided. The pixel unit driving circuit comprises: a plurality of scan signal lines each configured to provide a scan signal; and a plurality of data lines each configured to provide a data signal. The scan signal lines and the data lines are cross-connected with respective switch elements of the pixel unit to constitute a pixel unit driving circuit in a matrix form, wherein the pixel unit uses alternately switch elements having inverted polarities. The scan signal lines connected to the respective switch elements are configured to drive the respective switch elements with alternate high and low levels.

In another aspect of the present disclosure, a pixel unit driving method for driving a light emitting element of a pixel unit is provided. The pixel unit driving method comprises: cross-connecting scan signal lines and data lines with respective switch elements of the pixel unit to constitute a pixel unit driving circuit in a matrix form, wherein the pixel unit uses alternately switch elements having inverted polarities, and driving the respective switch elements with scan signals at alternate high and low levels.

In yet another aspect of the present disclosure, a display apparatus is provided. The display apparatus comprises the above pixel unit driving circuit.

DETAILED DESCRIPTION OF THE EMBODIMENTS

In the following, the embodiments of present disclosure will be described in detail with reference to the figures, such that the objects, solutions and advantages of the present disclosure will become more apparent.

The switching transistors and driving transistors in all the embodiments of the present disclosure can be TFTs or Field Effect Transistors (FETs) or other devices having the same characteristics. Preferably, the TFTs used in the embodiments of the present disclosure can be oxide semiconductor transistors. Since the source and drain of a switching transistor are symmetric, its source and drain are inter-exchangeable. In the embodiments of the present disclosure, in order to distinguish between the two electrodes other than the gate in a transistor, one of the two electrodes is referred to as source and the other is referred to as drain.

Figure 3:
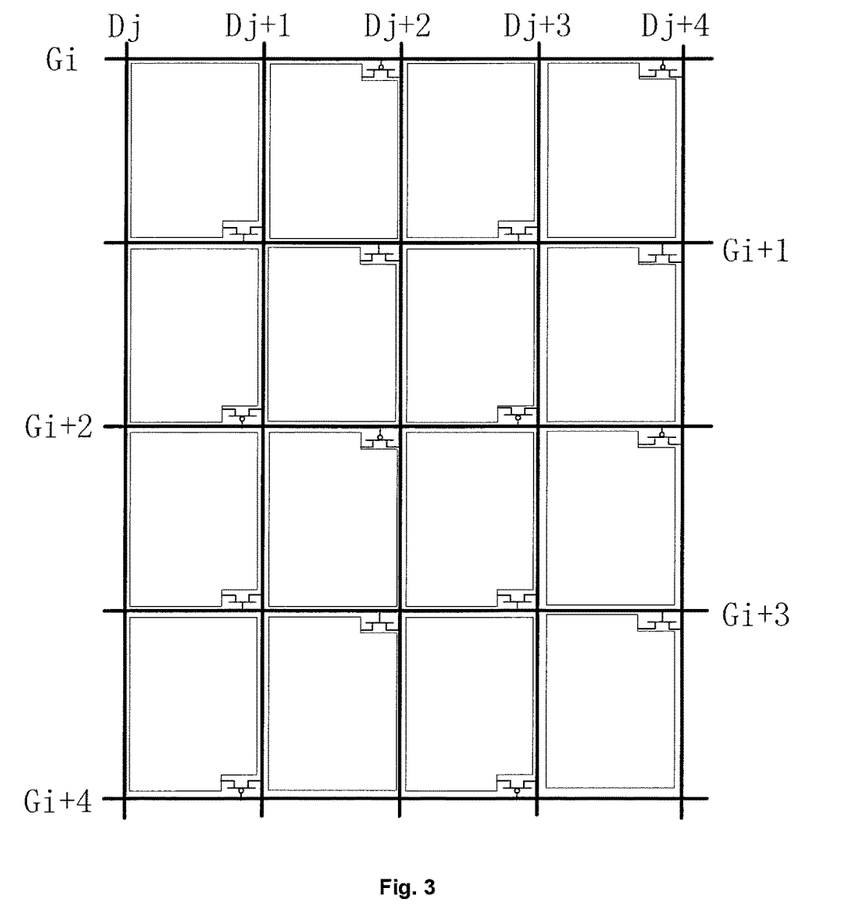
FIG. 3 is a schematic diagram showing a structure of a pixel unit driving circuit according to an embodiment of the present disclosure.

FIG. 3 is a schematic diagram showing a structure of a pixel unit driving circuit according to an embodiment of the present disclosure. As shown in FIG. 3, in the pixel unit driving circuit, scan signal lines G1-Gn are parallel to each other in the horizontal direction and data lines D1-Dm are parallel to each other in the vertical direction. The scan signal lines G1-Gn are connected to switch elements which are NMOS transistors and PMOS transistors alternately. Here, the polarities of switch elements alternate at an interval of one row or column. In particular, the scan signal lines in odd rows may be connected to the switch elements having one polarity and the scan signal lines in even rows may be connected to the switch elements having the other polarity. Of course, the polarities of switch elements may alternate at an interval of two or three or more rows or columns. Further, the switch elements in each row are connected to a data line. That is, the switch elements, Q, connected to the scan signal lines D1-Dm and the data lines D1-Dm use NMOS transistors and PMOS transistors alternately. In other words, the switch elements of any two neighboring pixel units in each row or column are transistors of opposite polarities. Thus, the voltage difference between the data lines and the pixel electrodes varies alternately between positive and negative, such that the vertical cross-interference in the displayed picture due to parasitic capacitance between the data lines and the pixel electrodes can be reduced. This is the pixel unit driving circuit according to the present disclosure that is implemented for the column inversion mode.

Figure 4:
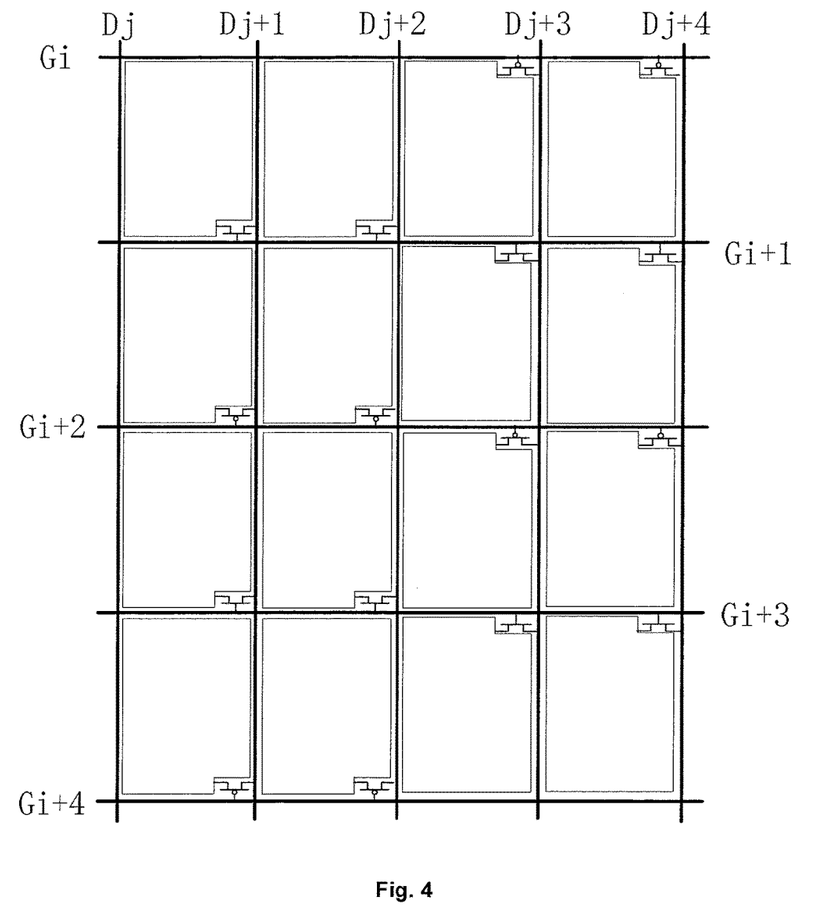
FIG. 4 is a schematic diagram showing a structure of another pixel unit driving circuit according to an embodiment of the present disclosure.

FIG. 4 is a schematic diagram showing a structure of another pixel unit driving circuit according to an embodiment of the present disclosure. As shown in FIG. 4, the switch elements Q connected to the scan signal lines D1-Dm and the data lines D1-Dm use NMOS transistors and PMOS transistors alternately at an interval of two rows (columns) in the horizontal (vertical) direction. Accordingly, a regional inversion mode can be achieved in units of two rows (columns). The voltage difference between the data lines and the pixel electrodes also varies alternately between positive and negative.

Figure 5:
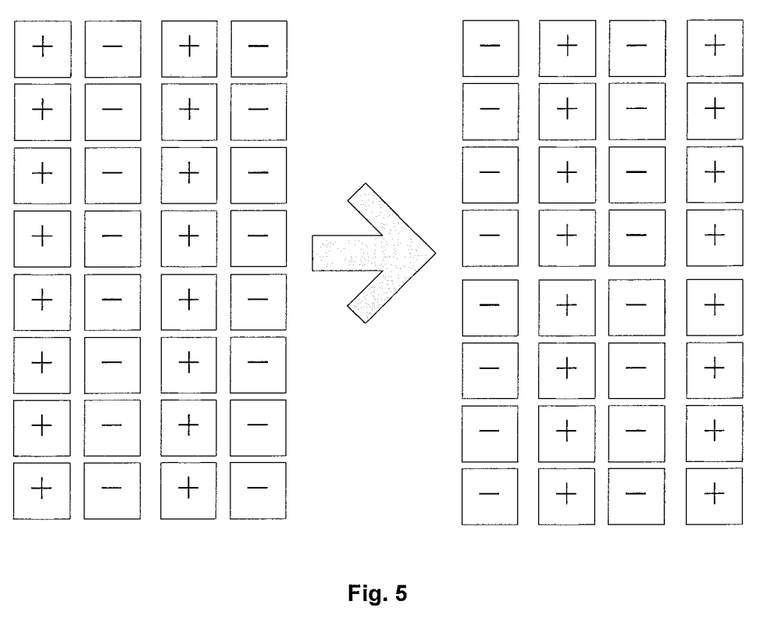
FIG. 5 is a schematic diagram showing operations of a conventional pixel unit driving circuit from the perspective of data line voltage.

FIG. 5 is a schematic diagram showing operations of a conventional pixel unit driving circuit from the perspective of data line voltage. As shown in FIG. 5, the pixel unit driving circuit uses a column inversion mode. At a particular time, the data line voltages on the switch elements in odd columns are positive and the data voltages on the switch elements in even columns are negative. In a next data period, the data line voltages on the switch elements in odd columns are negative and the data voltages on the switch elements in even columns are positive. The picture before the arrow in FIG. 5 is a first frame of picture and the picture after the arrow in FIG. 5 is a second frame of picture. In the column inversion mode, for example when the pixels in row G1 are being charged, the signals on the data lines will be applied to all of G1-Gm. The coupling effect between the data signal and the pixel electrodes will affect the maintained state of the pixels in other rows, thereby causing a vertical cross-interference in the displayed picture. When the data voltage changes from "+" to "−", for a particular switch element, the scanning would be on a per point basis and there would be coupling, delay and vertical cross-interference for the pixel units from top to bottom. During the driving periods for neighboring data signals in the timing sequence, since the switch elements in neighboring columns have the same polarity, a data signal having a positive driving voltage occurs in a first data signal driving period and a data signal having a negative driving voltage occurs in a next data signal driving period, such that the voltage difference between the data lines and the pixel electrodes varies alternately between positive and negative.

Figure 6:
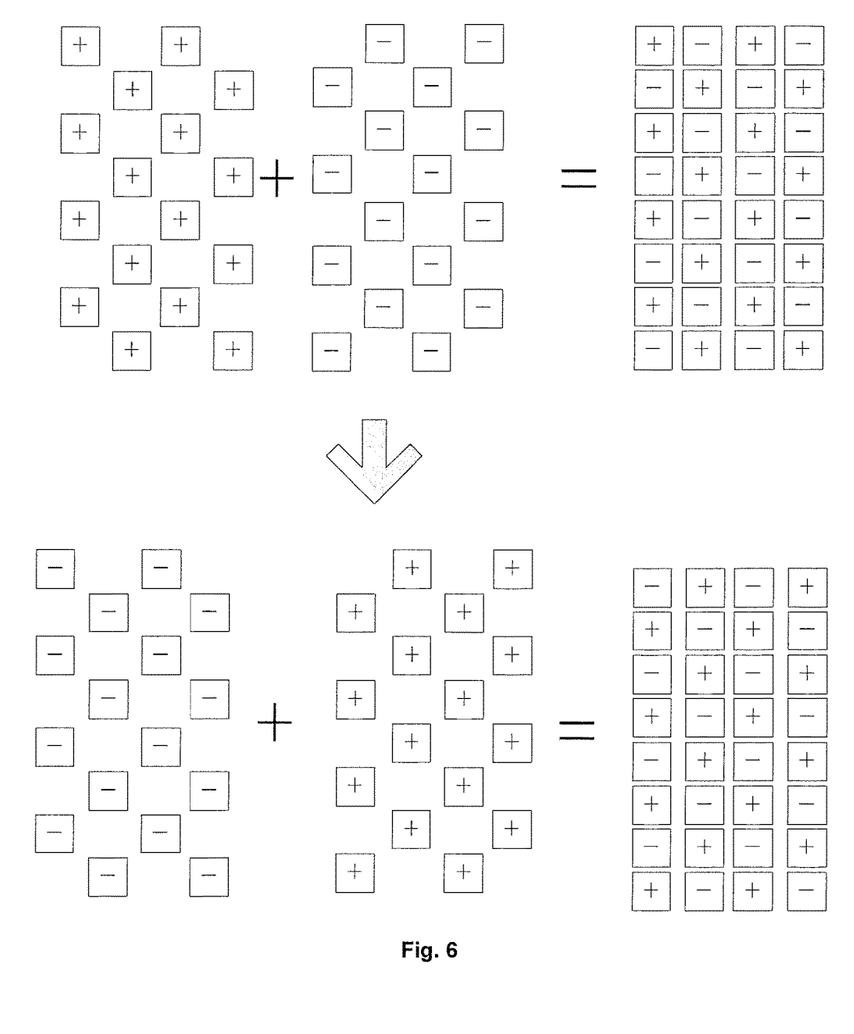
FIG. 6 is a schematic diagram showing operations of a pixel unit driving circuit according to an embodiment of the present disclosure from the perspective of data line voltage.

FIG. 6 is a schematic diagram showing operations of a pixel unit driving circuit according to an embodiment of the present disclosure from the perspective of data line voltage. As shown in FIG. 6, the polarities of the switch elements of the pixel unit change alternately in units of both row and column. In particular, the polarities of switch elements in neighboring rows or columns of the pixel unit are opposite to each other. According to this embodiment of the present disclosure, the point inversion mode driving is achieved by combination of two frame inversions. As shown in FIG. 6, the picture above the arrow is a first frame of picture and the picture below the arrow is a second frame of the picture. The pictures at both sides of the symbol "+" show signals before and after the column inversion, and the scan signals are provided by two operations. With the combination of the column inversion and the frame inversion, the voltage only needs to be applied to a half of the pixel units during each driving period, which is more power-saving. Similarly, during the driving periods for neighboring data signals in the timing sequence, since the switch elements in neighboring rows or columns have opposite polarities, a data signal having a positive driving voltage occurs in the first data signal driving period and a data signal having a negative driving voltage occurs in the next data signal driving period, such that the voltage difference between the data lines and the pixel electrodes varies alternately between positive and negative. In this way, the vertical cross-interference due to parasitic capacitance between the data lines and the pixel electrodes can be reduced.

The present disclosure also provides a display apparatus including the above pixel unit driving circuits. The display apparatus can be a liquid crystal panel, e-paper, mobile phone, tablet computer, television, display, notebook computer, digital photo frame, navigator, or any other produce or component that has a display function.

With the embodiments of the present disclosure, rows of pixel units in a panel are designed to use switch elements of the pixel units made of NMOS transistors and PMOS transistors alternately. That is, the switch elements connected to scan signal lines and data lines use NMOS transistors and PMOS transistors alternately in the horizontal (vertical) direction. In conjunction with a scan timing sequence, a high-low level time division scan technique can be adopted to allow the voltage difference between the data lines and the pixel electrodes to vary alternately between positive and negative. In this way, the vertical cross-interference due to parasitic capacitance between the data lines and the pixel electrodes can be reduced.

While the above embodiments have been described for further explaining the objects, solutions and advantages of the present disclosure, it can be appreciated that the embodiments are illustrative only, rather than limiting the present disclosure. Any modifications, alternatives and improvements made without departing from the spirit and principle of the present disclosure should be encompassed by the scope of the present disclosure.

What is claimed is:

1. A pixel unit driving circuit for driving a light emitting element of a pixel unit, comprising:
    a plurality of scan signal lines each configured to provide a scan signal;
    a plurality of data lines each configured to provide a data signal, and
    a plurality of pixel units, each comprising a switch element connected to one of the scan signal lines and one of the data lines;
    wherein the switch elements of the plurality of pixel units comprising n-type or p-type elements,
    wherein the scan signal lines and the data lines are cross-connected with respective switch elements of the pixel unit to constitute a pixel unit driving circuit in a matrix form, and wherein switch elements in each row of pixel units use alternately inverted switch types, the switch elements in each row of pixel units that have the N-type elements are directly connected to a first scan signal line, the switch elements in each row of pixel units that have the P-type elements are directly connected to a second scan signal line that is adjacent to the first scan signal line, and wherein switch elements that directly connect to the same scan signal line have the same types; and
    wherein the scan signal lines connected to the respective switch elements are configured to drive the respective switch elements with alternate high and low levels.

2. The pixel unit driving circuit of claim 1, wherein NMOS transistors and PMOS transistors are used as the respective switch elements alternately.

3. The pixel unit driving circuit of claim 2, wherein NMOS transistors and PMOS transistors are used as the respective switch elements of the pixel units in a same row alternately in odd and even columns.

4. The pixel unit driving circuit of claim 2, wherein NMOS transistors and PMOS transistors are used as the respective switch elements of the pixel units in a same row alternately in odd and even rows.

5. The pixel unit driving circuit of claim 1, wherein the polarities of the switch elements alternate at an interval of a plurality of rows or columns.

6. The pixel unit driving circuit of claim 1, wherein the polarities of the respective switch elements alternate at an interval of one pixel.

7. The pixel unit driving circuit of claim 1, wherein the scan signal lines in odd rows are connected to the switch elements having one polarity and the scan signal lines in even rows are connected to the switch elements having the other polarity.

8. A display apparatus, comprising the pixel unit driving circuit according to claim 1.

9. The display apparatus of claim 8, wherein NMOS transistors and PMOS transistors are used as the respective switch elements alternately.

10. The display apparatus of claim 9, wherein NMOS transistors and PMOS transistors are used as the respective switch elements of the pixel units in a same row alternately in odd and even columns.

11. The display apparatus of claim 9, wherein NMOS transistors and PMOS transistors are used as the respective switch elements of the pixel units in a same row alternately in odd and even rows.

12. The display apparatus of claim 8, wherein the polarities of the switch elements alternate at an interval of a plurality of rows or columns.

13. The display apparatus of claim 8, wherein the polarities of the respective switch elements alternate at an interval of one pixel.

14. The display apparatus of claim 8, wherein the scan signal lines in odd rows are connected to the switch elements having one polarity and the scan signal lines in even rows are connected to the switch elements having the other polarity.

15. The display apparatus of claim 8, wherein the switch elements in two adjacent rows of pixel units that have the same switch type are connected to a same scan signal line.

16. The display apparatus of claim 8, wherein the types of switch elements in each row of pixel units alternate at an interval of one or more columns.

17. The pixel unit driving circuit of claim 1, wherein the switch elements in two adjacent rows of pixel units that have the same switch type are connected to a same scan signal line.

18. The pixel unit driving circuit of claim 1, wherein the pixel units in odd columns in ith row are driven by the ith scan signal line, and the pixel units in even column in ith row are driven by the (i+1)th scan signal line, wherein i is a positive integer.

19. The pixel unit driving circuit of claim 1, wherein the types of switch elements in each row of pixel units alternate at an interval of one or more columns.

* * * * *